United States Patent
Jiang et al.

(10) Patent No.: US 11,858,417 B2
(45) Date of Patent: Jan. 2, 2024

(54) SUN VISOR WITH MAGNETIC SWITCH

(71) Applicant: Daimay North America Automotive, Inc., Redford, MI (US)

(72) Inventors: Yintai Jiang, Shaghai (CN); Jianhua Wang, Novi, MI (US)

(73) Assignee: Daimay North America Automotive, Inc., Redford, MI (US)

( * ) Notice: Subject to any disclaimer, the term of this patent is extended or adjusted under 35 U.S.C. 154(b) by 495 days.

(21) Appl. No.: 17/261,723

(22) PCT Filed: Sep. 26, 2018

(86) PCT No.: PCT/CN2018/107639
§ 371 (c)(1),
(2) Date: Jan. 20, 2021

(87) PCT Pub. No.: WO2020/061825
PCT Pub. Date: Apr. 2, 2020

(65) Prior Publication Data
US 2021/0316658 A1 Oct. 14, 2021

(51) Int. Cl.
*B60J 3/00* (2006.01)
*B60Q 3/82* (2017.01)
*B60Q 3/252* (2017.01)
*B60J 3/02* (2006.01)

(52) U.S. Cl.
CPC .............. *B60Q 3/82* (2017.02); *B60J 3/0282* (2013.01); *B60Q 3/252* (2017.02)

(58) Field of Classification Search
CPC ........... B60J 3/0282; B60Q 3/252; B60Q 3/82

USPC ........................................................ 296/97.2
See application file for complete search history.

(56) References Cited

U.S. PATENT DOCUMENTS

| 1,747,210 | A | * | 2/1930 | Babcock | H04M 3/12 |
| | | | | | 377/16 |
| 6,027,234 | A | * | 2/2000 | Austin | H01H 15/10 |
| | | | | | 362/490 |
| 6,499,868 | B1 | * | 12/2002 | Kerul, Jr. | B60J 3/0282 |
| | | | | | 362/492 |
| 6,679,311 | B2 | | 1/2004 | Aguilar | |
| 2017/0158121 | A1 | * | 6/2017 | Lehman | B60Q 3/64 |

FOREIGN PATENT DOCUMENTS

| CN | 2723248 Y | 9/2005 |
| CN | 101264745 A | 9/2008 |
| CN | 204020498 U | 12/2014 |

(Continued)

OTHER PUBLICATIONS

International Search Report and Written Opinion for PCT Application PCT/CN2018/107639 dated Mar. 2, 2020.

*Primary Examiner* — Dennis H Pedder
(74) *Attorney, Agent, or Firm* — Carlson, Gaskey & Old, P.C.

(57) ABSTRACT

A sun visor according to an exemplary aspect of the present disclosure includes, among other things, a magnetic switch, and a vanity including a light. The light is configured to turn on and off when the magnetic switch is activated and deactivated. The sun visor further includes a vanity cover moveable between an open position and a closed position. Further, movement of the vanity cover relative to the vanity is configured to activate and deactivate the magnetic switch.

10 Claims, 2 Drawing Sheets

(56) References Cited

FOREIGN PATENT DOCUMENTS

| | | |
|---|---|---|
| CN | 204845460 U | 12/2015 |
| CN | 106274397 A | 1/2017 |
| CN | 108236179 A | 7/2018 |
| DE | 102011100047 A1 | 10/2012 |
| JP | 2005512889 A * | 5/2005 |

* cited by examiner

SUN VISOR WITH MAGNETIC SWITCH

BACKGROUND

This disclosure relates to a sun visor with a magnetic switch.

A sun visor is a component for an automobile located in the vehicle interior, and typically positioned just above the windshield. Sun visors are hingedly connected to the vehicle, and are moveable between a stored position and a deployed position. When deployed, the sun visor is configured to help shade the eyes of a driver or a passenger from the glare of sunlight.

Sun visors are known to include vanities, including a mirror and one or more lights. The vanities often include a hinged vanity cover configured to open and close to selectively expose the mirror and lights. Some known vanities include a mechanical switch incorporated into a hinge of a vanity cover. The mechanical switch is selectively activated and deactivated by rotation of the vanity cover to turn the lights on and off.

SUMMARY

A sun visor according to an exemplary aspect of the present disclosure includes, among other things, a magnetic switch, and a vanity including a light. The light is configured to turn on and off when the magnetic switch is activated and deactivated. The sun visor further includes a vanity cover moveable between an open position and a closed position. Further, movement of the vanity cover relative to the vanity is configured to activate and deactivate the magnetic switch.

In a further non-limiting embodiment of the foregoing sun visor, the magnetic switch includes a first magnetic switch component and a second magnetic switch component, the vanity includes the first magnetic switch component, and the vanity cover includes the second magnetic switch component.

In a further non-limiting embodiment of any of the foregoing sun visors, the first magnetic switch component is a switch responsive to a magnetic field.

In a further non-limiting embodiment of any of the foregoing sun visors, the switch is mounted to a printed circuit board adjacent the vanity.

In a further non-limiting embodiment of any of the foregoing sun visors, the printed circuit board supports one or more electronic components configured to turn the light on and off when the magnetic switch is activated and deactivated.

In a further non-limiting embodiment of any of the foregoing sun visors, the printed circuit board includes a projection supporting the switch.

In a further non-limiting embodiment of any of the foregoing sun visors, the vanity includes a mirror adjacent the light, and the switch is covered by at least one of the mirror and the light.

In a further non-limiting embodiment of any of the foregoing sun visors, the second magnetic switch component is a magnet.

In a further non-limiting embodiment of any of the foregoing sun visors, the magnet is covered by a bumper.

In a further non-limiting embodiment of any of the foregoing sun visors, when the cover is closed, the magnet is substantially aligned with the first magnetic switch component.

A sun visor for a vehicle according to another exemplary aspect of the present disclosure includes, among other things, a main body portion configured to hinge relative to a vehicle support structure. The main body portion includes a vanity and a magnetic switch having a first magnetic switch component and a second magnetic switch component. The vanity includes a light and the first magnetic switch component. The light is configured to turn on and off when the magnetic switch is activated and deactivated. Further, the main body portion includes a vanity cover moveable between an open position and a closed position. The vanity cover includes the second magnetic switch component. Additionally, movement of the vanity cover relative to the vanity is configured to activate and deactivate the magnetic switch.

In a further non-limiting embodiment of the foregoing sun visor, the first magnetic switch component is a switch responsive to a magnetic field.

In a further non-limiting embodiment of any of the foregoing sun visors, the switch is mounted to a printed circuit board within the main body portion of the sun visor.

In a further non-limiting embodiment of any of the foregoing sun visors, the printed circuit board supports one or more electronic components configured to turn the light on and off when the magnetic switch is activated and deactivated.

In a further non-limiting embodiment of any of the foregoing sun visors, the printed circuit board includes a projection supporting the switch.

In a further non-limiting embodiment of any of the foregoing sun visors, the vanity includes a mirror adjacent the light, and wherein the switch is covered by at least one of the mirror and the light.

In a further non-limiting embodiment of any of the foregoing sun visors, the second magnetic switch component is a magnet.

In a further non-limiting embodiment of any of the foregoing sun visors, the magnet is covered by a bumper.

In a further non-limiting embodiment of any of the foregoing sun visors, when the cover is closed, the magnet is substantially aligned with the first magnetic switch component.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

In FIG. 5, a rim of the vanity cover is spaced-apart from a rim of the vanity.

DETAILED DESCRIPTION

This disclosure relates to a sun visor including a magnetic switch. The magnetic switch is used, in one example, to selectively turn a light on and off as a vanity cover is opened and closed, respectively. The magnetic switch improves light performance and prevents issues such as flashing or flickering of the light, which are problems associated with sun visors including mechanical switches. The magnetic switch further improves performance by eliminating malfunctions (e.g., such as when the light stays on or off) associated with mechanical switches. Additionally, the present disclosure provides for a more robust hinge, as the magnetic switch does not need to be incorporated into a hinge of the vanity cover.

Figure 1:
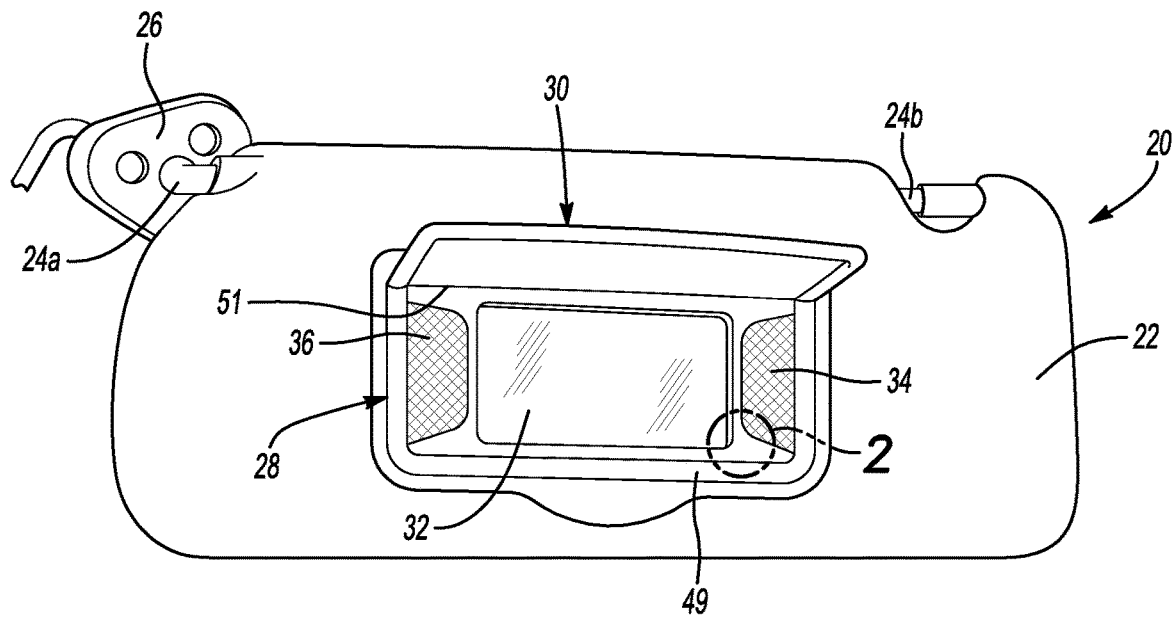
FIG. 1 illustrates an example sun visor according to the present disclosure.

FIG. 1 illustrates an example sun visor 20 for a vehicle. The sun visor 20 includes a main body portion 22 and first and second hinge elements 24a, 24b. The first hinge element 24a is connected to a mounting structure 26, which is used to connect the sun visor 20 to a vehicle support structure, such as a roof of the vehicle above a vehicle windshield.

The main body portion 22 is configured to hinge about hinge elements 24a, 24b between a stored position and a deployed position. In the deployed position, the main body portion 22 helps shade the eyes of a driver or passenger of a vehicle from the glare of sunlight.

The sun visor 20 also includes a vanity 28 and a vanity cover 30 in this example. The vanity cover 30 is configured to hinge between an open position and a closed position relative to the vanity 28. In this example, the vanity 28 includes a mirror 32 and two lights 34, 36 on opposite sides of the mirror 32. The lights 34, 36 may be light emitting diode (LED) lights in one example. While two lights 34, 36 are illustrated, this disclosure extends to vanities including one or more lights. The lights 34, 36 are configured to turn on and off as the vanity cover 30 opens and closes, respectively. The vanity cover 30 is in the open position in FIG. 1.

In this disclosure, the sun visor 20 includes a magnetic switch 38 selectively activated and deactivated to turn the lights 34, 36 on and off. The magnetic switch 38 includes a first magnetic switch component 40 (FIG. 2) incorporated into the vanity 28 and a second magnetic switch component 42 (FIG. 3) incorporated into the vanity cover 30. Movement of the vanity cover 30 relative to the vanity 28 activates and deactivates the magnetic switch 38. In one example, the magnetic switch 38 includes a reed switch, however this disclosure extends to other types of electrical switches operated by applied magnetic fields.

Figure 2:
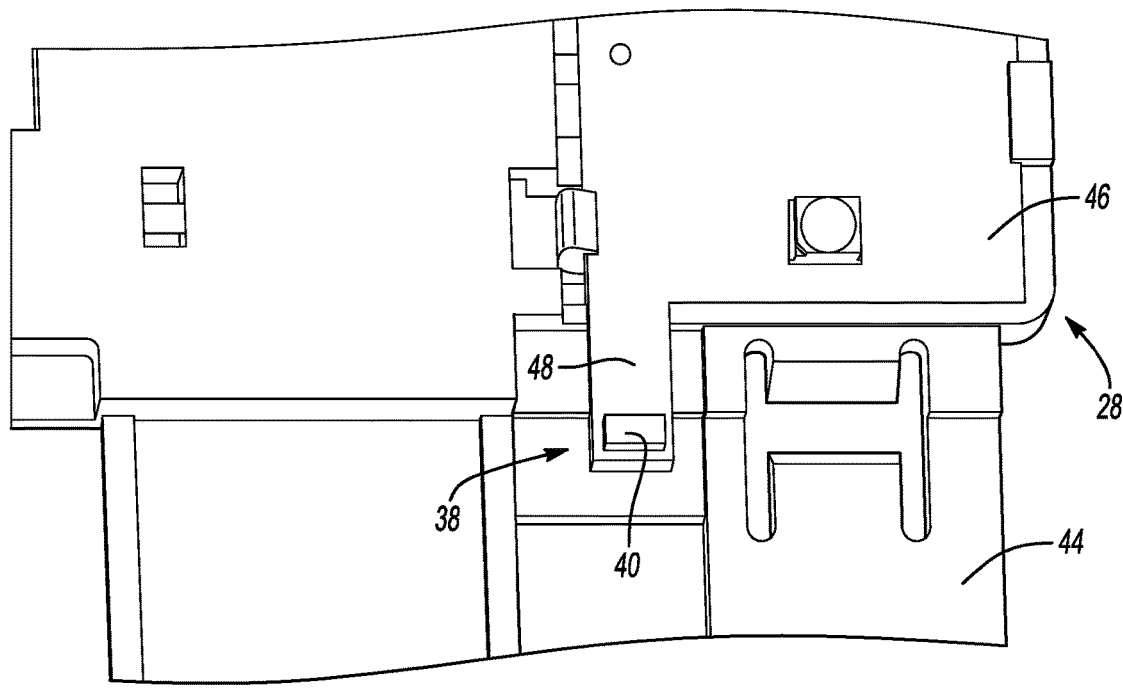
FIG. 2 illustrates an example frame of a vanity of the sun visor of FIG. 1.
Figure 3:
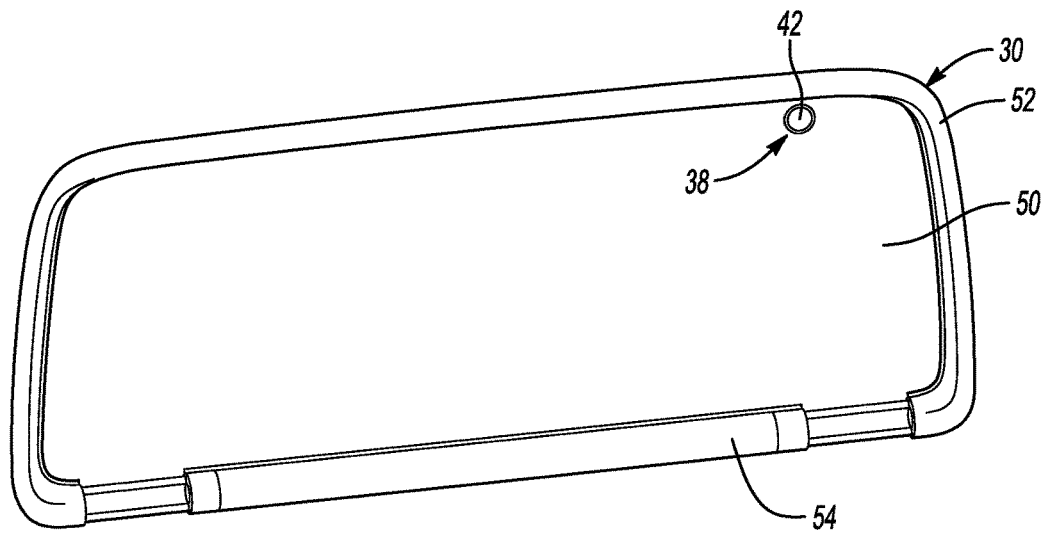
FIG. 3 illustrates an example vanity cover of the sun visor of FIG. 1.

FIG. 2 illustrates the first magnetic switch component 40 relative to a frame 44 of the vanity 28. The frame 44 is supported by the main body portion 22 in this example. The frame 44 in this example is a single piece of plastic material. The frame 44 supports the mirror 32, the lights 34, 36, and a printed circuit board (PCB) 46, among other things. The PCB 46 is a board supporting electronic components. One such component is the first magnetic switch component 40. The PCB 46 is electrically couples the first magnetic switch component 40 to other electronic components mounted to the PCB 46. The other electronic components are configured to turn the lights 34, 36 on and off in response to activation and deactivation of the first magnetic switch component 40.

In this example, the first magnetic switch component 40 is supported on a projection 48 of the PCB 46. The projection 48 positions the first magnetic switch component 40 adjacent a rim 49 of the vanity 28 substantially opposite a hinge 51 of the vanity 28. In this example, the first magnetic switch component 40 is covered by at least one of the mirror 32 and the lights 34, 36 when the vanity 28 is assembled, such as in FIG. 1.

Figure 4:
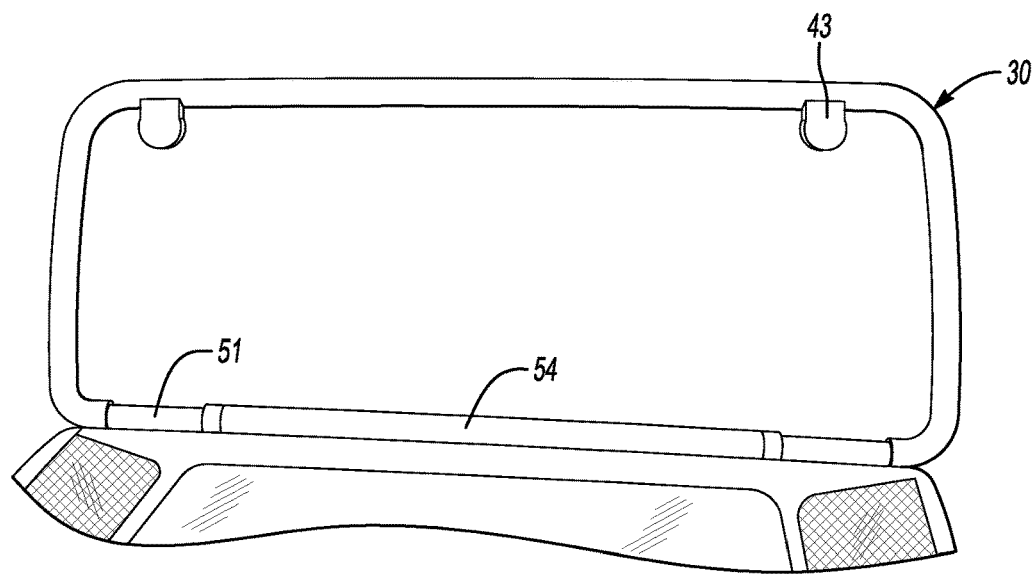
FIG. 4 illustrates the sun visor with the vanity cover in an open position.

The first magnetic switch component 40 in this example is a switch responsive to a magnetic field. The magnetic field, in this example, is provided by the second magnetic switch component 42, which in this example is a magnet. The second magnetic switch component 42 is a permanent magnet in one example. In one example, the vanity cover 30 includes a bumper 43 (FIG. 4) covering the second magnetic switch component 42. The bumper 43 is attached to the second magnetic switch component 42 by an adhesive in one example. The magnetic field generated by the second magnetic switch component 42 is strong enough to permeate through the bumper 43, the mirror 32, and the lights 34, 36.

The second magnetic switch component 42 is molded into the vanity cover 30 such that it is flush relative to a central body portion 50 of the vanity cover 30. The second magnetic switch component 42 is arranged adjacent a rim 52 of the vanity cover 30 and substantially opposite a hinge 54 of the vanity cover 30, such that when the vanity cover 30 is closed the first and second magnetic switch components 40, 42 substantially align with one another.

The first and second magnetic switch components 40, 42 are provided opposite the hinges 51, 54 such that the magnetic switch 38 will be activated soon after the vanity cover 30 is opened, and will be deactivated soon before the vanity cover 30 is closed. In one example, the magnetic field generated by the second magnetic switch component 42 is of a strength such that the magnetic switch 38 is activated and deactivated without the rims 49, 52 of the vanity 28 and the vanity cover 30 touching.

Figure 5:
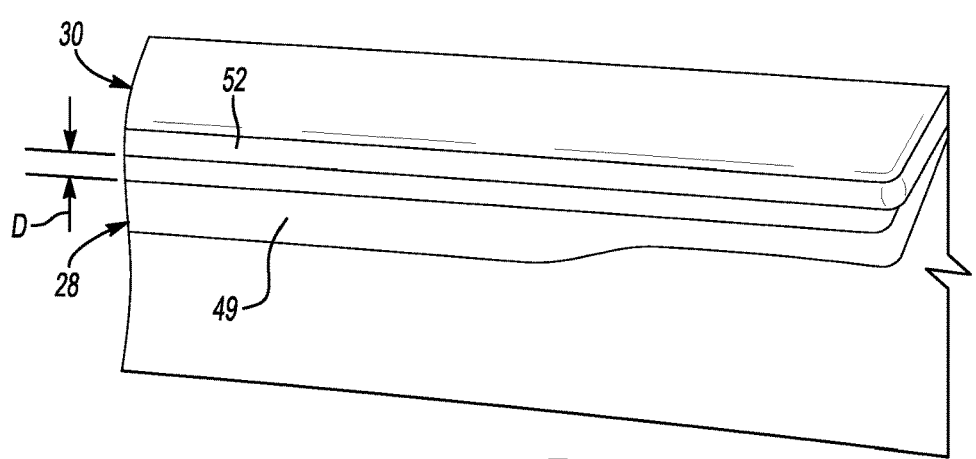
FIG. 5 illustrates the sun visor, and is representative of a position of the vanity cover soon after the vanity cover is opened, or soon before the vanity cover is closed.

In FIG. 5, the rims 49, 52 are spaced-apart by a distance D. FIG. 5 illustrates the vanity cover 30 in a position where the magnetic switch 38 becomes activated if opening the vanity cover 30, and where the magnetic switch 38 becomes deactivated if closing the vanity cover 30. Thus, using the disclosed arrangement, the lights 34, 36 turn on before the vanity cover 30 is fully opened, and the lights turn off just before the vanity cover 30 is fully closed.

Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A sun visor, comprising:
   a magnetic switch;
   a vanity including a light, wherein the light is configured to turn on and off when the magnetic switch is activated and deactivated; and
   a vanity cover moveable between an open position and a closed position, wherein movement of the vanity cover relative to the vanity is configured to activate and deactivate the magnetic switch,
   wherein the magnetic switch includes a first magnetic switch component and a second magnetic switch component,
   wherein the vanity includes the first magnetic switch component, wherein the vanity cover includes the second magnetic switch component, wherein the first magnetic switch component is a switch responsive to a magnetic field, wherein the switch is mounted to a printed circuit board adjacent the vanity, and wherein the printed circuit board includes a projection supporting the switch adjacent a rim of the vanity and substantially opposite a hinge of the vanity.

2. The sun visor as recited in claim 1, wherein the vanity includes a mirror adjacent the light, and wherein the switch is covered by at least one of the mirror and the light.

3. The sun visor as recited in claim 1, wherein the second magnetic switch component is a magnet.

4. The sun visor as recited in claim 3, wherein the magnet is covered by a bumper.

5. The sun visor as recited in claim 3, wherein, when the cover is closed, the magnet is substantially aligned with the first magnetic switch component.

6. A sun visor for a vehicle, comprising:

a main body portion configured to hinge relative to a vehicle support structure, the main body portion including a vanity and a magnetic switch having a first magnetic switch component and a second magnetic switch component, the vanity including a light and the first magnetic switch component, wherein the light is configured to turn on and off when the magnetic switch is activated and deactivated, the main body portion further including a vanity cover moveable between an open position and a closed position, the vanity cover including the second magnetic switch component, and wherein movement of the vanity cover relative to the vanity is configured to activate and deactivate the magnetic switch, wherein the first magnetic switch component is a switch responsive to a magnetic field, wherein the switch is mounted to a printed circuit board within the main body portion of the sun visor, and wherein the printed circuit board includes a projection supporting the switch adjacent a rim of the vanity and substantially opposite a hinge of the vanity.

7. The sun visor as recited in claim 6, wherein the vanity includes a mirror adjacent the light, and wherein the switch is covered by at least one of the mirror and the light.

8. The sun visor as recited in claim 6, wherein the second magnetic switch component is a magnet.

9. The sun visor as recited in claim 8, wherein the magnet is covered by a bumper.

10. The sun visor as recited in claim 8, wherein, when the cover is closed, the magnet is substantially aligned with the first magnetic switch component.

* * * * *